United States Patent
Sugie

(10) Patent No.: US 10,855,213 B2
(45) Date of Patent: Dec. 1, 2020

(54) MOTOR DRIVER DEVICE AND SEMICONDUCTOR DEVICE

(71) Applicant: Rohm Co., Ltd., Kyoto (JP)

(72) Inventor: Hisashi Sugie, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/537,664

(22) Filed: Aug. 12, 2019

(65) Prior Publication Data

US 2020/0059174 A1 Feb. 20, 2020

(30) Foreign Application Priority Data

Aug. 20, 2018 (JP) .................................. 2018-154165

(51) Int. Cl.
| | |
|---|---|
| H02P 6/16 | (2016.01) |
| H02P 6/182 | (2016.01) |
| H02P 6/22 | (2006.01) |
| H02P 6/15 | (2016.01) |

(52) U.S. Cl.
CPC .............. *H02P 6/182* (2013.01); *H02P 6/15* (2016.02); *H02P 6/22* (2013.01)

(58) Field of Classification Search
CPC ................................... H02P 6/182; H02P 6/15
USPC .................................................. 318/400.04
See application file for complete search history.

(56) References Cited

U.S. PATENT DOCUMENTS

| | | | | |
|---|---|---|---|---|
| 5,977,737 A | * | 11/1999 | Labriola, II | G05B 11/28 318/560 |
| 2008/0252238 A1 | * | 10/2008 | Otaguro | G11B 19/28 318/400.05 |
| 2015/0069939 A1 | * | 3/2015 | Khan | H02P 25/032 318/400.2 |
| 2015/0381096 A1 | * | 12/2015 | Klemm | A61C 15/047 318/130 |

FOREIGN PATENT DOCUMENTS

| | | |
|---|---|---|
| JP | H10-341588 | 12/1998 |
| JP | 6231357 | 10/2017 |

* cited by examiner

*Primary Examiner* — Erick D Glass
(74) *Attorney, Agent, or Firm* — Fish & Richardson P.C.

(57) ABSTRACT

A motor driver device includes: a detector that detects a polarity inversion timing of a current flowing through a coil of a predetermined phase of a motor; a drive control signal generator that generates a pulse-width-modulated or pulse-density-modulated drive control signal for each phase based on the detection result; and a drive voltage supply that supplies a drive voltage corresponding to the drive control signal to a corresponding coil, wherein the drive control signal generator includes a prediction processor configured to set a detection prediction interval based on two or more previously detected polarity inversion timings, and executes a frequency variable control to set a variable target frequency to be higher in the detection prediction interval than outside the detection prediction interval, the variable target frequency being a frequency of the pulse-width-modulated drive control signal or a reciprocal of a minimum pulse width of the pulse-density-modulated drive control signal.

10 Claims, 11 Drawing Sheets

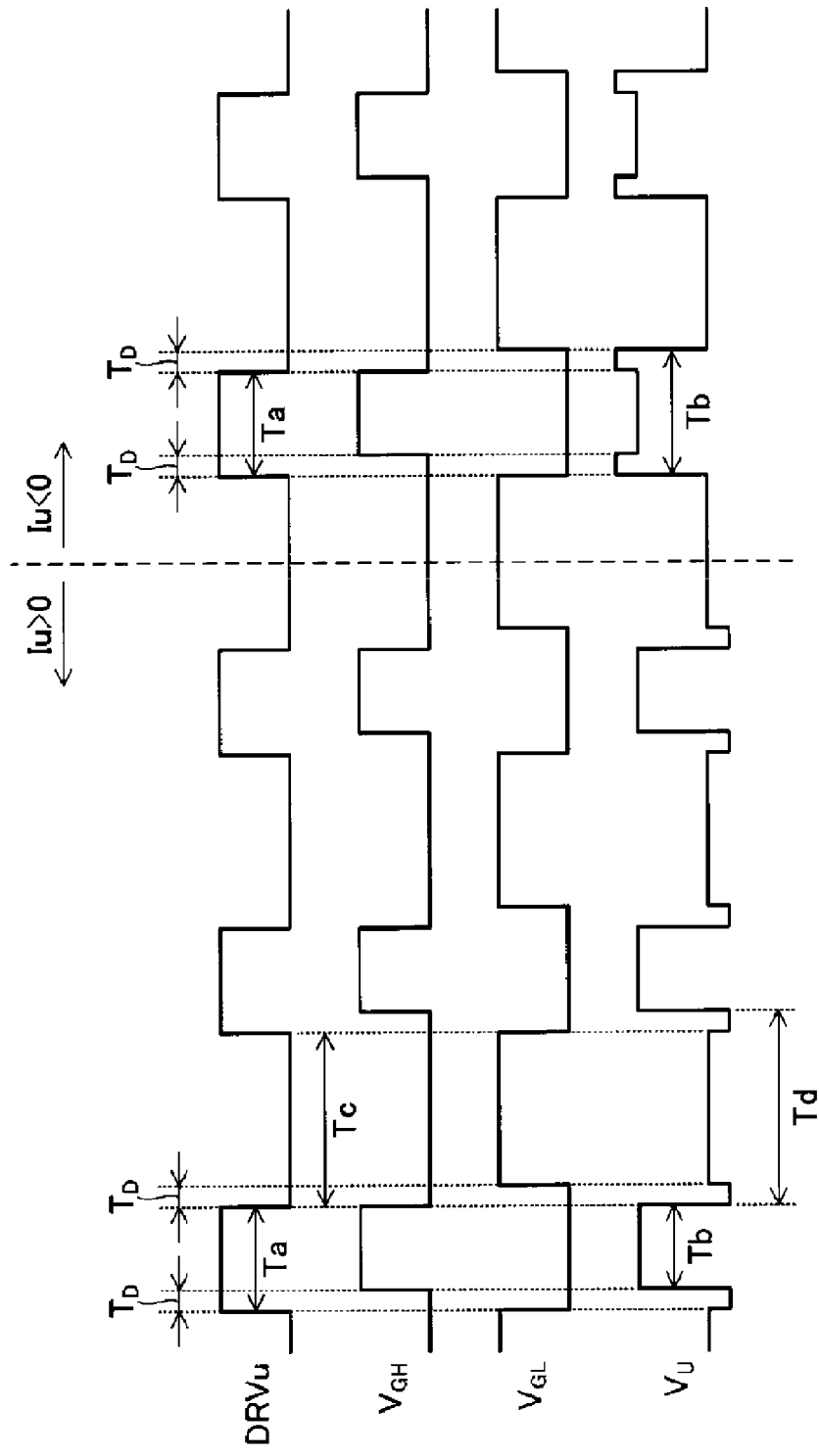

FIG. 11
Frequency variable control
| | Within detection prediction interval | Outside detection prediction interval |
|---|---|---|
| Variable target frequency | $f_H$ | $f_L$ |
※ $f_H > f_L$
FIG. 12
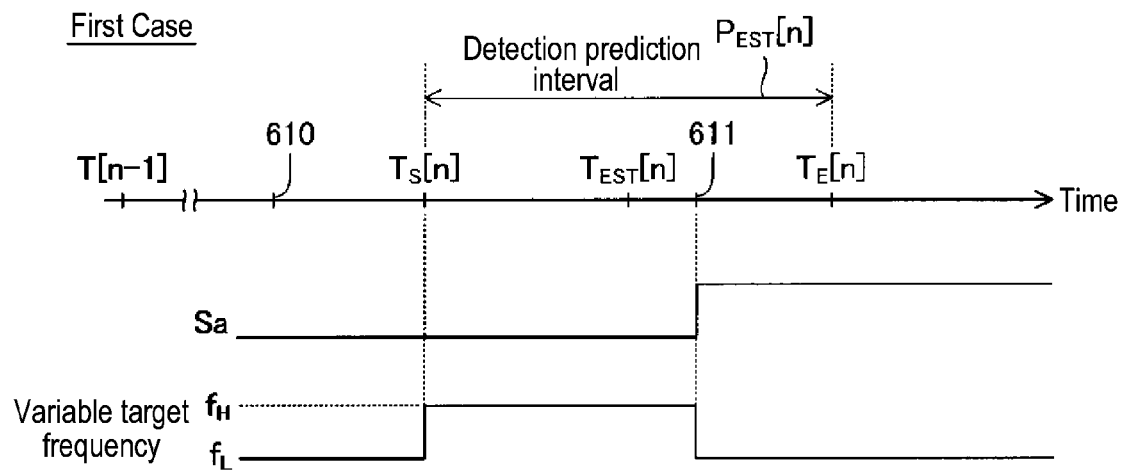
FIG. 13
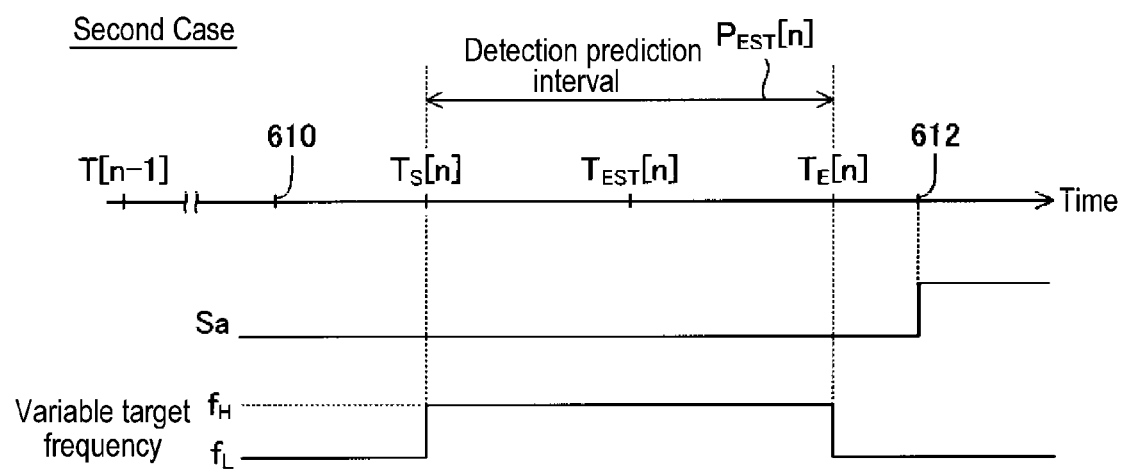

| PWM frequency | Detection resolution of current polarity | |
|---|---|---|
| 100kHz | Low | High |
| 1MHz | High | Low |

MOTOR DRIVER DEVICE AND SEMICONDUCTOR DEVICE

CROSS-REFERENCE TO RELATED APPLICATION

This application is based upon and claims the benefit of priority from Japanese Patent Application No. 2018-154165, filed on Aug. 20, 2018, the entire contents of which are incorporated herein by reference.

TECHNICAL FIELD

The present disclosure relates to a motor driver device and a semiconductor device.

BACKGROUND

In a motor such as a brushless DC motor that does not have a brush-based commutation mechanism, it is necessary to switch the direction of a current supplied to a coil according to the position of a rotor. Widely known driving systems of a brushless DC motor include a system that uses rotor position information obtained from a Hall element and a sensorless system to estimate the position of a rotor based on a zero-cross point of a counter electromotive force (induced voltage) generated in a coil without using a Hall element.

Widely used control methods of a three-phase brushless motor include a 120-degree conduction system (rectangular wave drive) and a 180-degree conduction system (sinusoidal wave drive). The 120-degree conduction system has an advantage of relative ease of control, while the 180-degree conduction system has an advantage of relatively good characteristics in terms of silence and vibration.

In the sensorless system, in order to detect the counter electromotive force, it is necessary to make a current flow through the coil zero. In the 120-degree conduction system, since a non-conduction interval is set for a coil of each phase, it is possible to easily detect the counter electromotive force by using the set non-conduction interval. On the other hand, in the 180-degree conduction system, since a current always flows in each coil, the non-conduction interval cannot be used as in the 120-degree conduction system. Therefore, in the 180-degree conduction system employs, a method can be used to set a window interval including a time at which a zero-cross point of the counter electromotive force occurs and to forcibly set the output of a driver to a high impedance state in the window interval. However, the setting of the window interval may impair the silence characteristic or the like, which is an inherent advantage of the 180-degree conduction system.

Taking this into consideration, there has been proposed a system that does not require the output of the driver to be forced to a high impedance state (hereinafter referred to as a windowless system for the sake of convenience). In the windowless system, at least the terminal voltage of a coil is used to detect a polarity inversion timing of a current flowing through the coil (a timing at which the direction of current flow is inverted). By periodically detecting (sampling) the polarity of the current, it is possible to acquire phase information of the current and generate a drive control signal, which is pulse-width-modulated based on the acquired phase information. Then, the motor can be sensorlessly driven by supplying a drive voltage having a duty based on the drive control signal to the coil of each phase.

A sampling frequency for the current polarity detection in the above-described windowless system depends on a PWM frequency, which is the frequency of the drive control signal in principle. That is to say, as the PWM frequency is changed, the sampling frequency is changed accordingly. Therefore, although increasing the PWM frequency increases the sampling frequency and increases the resolution of the current polarity detection, simply increasing the PWM frequency causes a decrease in the resolution of the drive control signal.

This will be described with reference to FIG. 18. Now, for the purpose of substantiation of the description, it is assumed that a drive control signal is generated based on a 20 MHz reference clock. In this case, the pulse width of the drive control signal varies with 50 ns (nanoseconds), which is the reciprocal of 20 MHz, as the minimum adjustment unit. At this time, a case where the PWM frequency is 100 kHz is compared with a case where the PWM frequency is 1 MHz. Since the reciprocal of 100 kHz is 10 μs (microseconds), when the PWM frequency is 100 kHz, the adjustment resolution of the pulse width of the drive control signal is "50 ns/10 μs=0.5%." On the other hand, since the reciprocal of 1 MHz is 1 μs (microsecond), when the PWM frequency is 1 MHz, the adjustment resolution of the pulse width of the drive control signal is "50 ns/1 μs=5%."

As such, simply increasing the PWM frequency to increase the resolution of the current polarity detection causes a decrease in the resolution of the drive control signal. The decrease in the resolution of the drive control signal leads to an increase in torque ripple of the motor. Therefore, it is desired to suggest a system that enhances the resolution of the current polarity detection (in other words, the detection resolution of the polarity inversion timing) while suppressing the decrease in the resolution of the drive control signal. Although the background art has been described on the assumption that the pulse width modulation is used to generate a drive control signal, similar circumstances exist when pulse density modulation is used to generate a drive control signal.

SUMMARY

Some embodiments of the present disclosure provide a motor driver device and a semiconductor device which contribute to improvement in resolution of current polarity detection (in other words, detection resolution of polarity inversion timing) while suppressing a decrease in resolution of a drive control signal.

A first aspect of the present disclosure provides a motor driver device that switchingly drives a brushless direct current (DC) motor having coils of a plurality of phases. The motor driver device includes: a detector configured to detect a polarity inversion timing of a current flowing through a coil of a predetermined phase based on a terminal voltage generated at one end of the coil of the predetermined phase; a drive control signal generator configured to generate a pulse-width-modulated or pulse-density-modulated drive control signal for each of the phases based on the detection result of the detector; and a drive voltage supply configured to supply a drive voltage, which corresponds to the drive control signal for each of the phases, to a corresponding one of the coils, wherein the drive control signal generator includes a prediction processor configured to set a detection prediction interval based on two or more previously detected polarity inversion timings, and executes a frequency variable control to set a variable target frequency to be higher in the detection prediction interval than outside the detection prediction interval, the variable target frequency being a frequency of the pulse-width-modulated drive control signal or a reciprocal of a minimum pulse width of the pulse-density-modulated drive control signal.

In some embodiments, in the frequency variable control, the drive control signal generator may set the variable target frequency to a predetermined first frequency outside the detection prediction interval, and set the variable target frequency to a predetermined second frequency higher than the first frequency in the detection prediction interval. Upon detecting the polarity inversion timing after a start of the detection prediction interval, the drive control signal generator may return the variable target frequency from the second frequency to the first frequency in response to the detection of the polarity inversion timing.

In some embodiments, when the detection prediction interval ends without detecting the polarity inversion timing after the start of the detection prediction interval, the drive control signal generator may return the variable target frequency from the second frequency to the first frequency in response to the end of the detection prediction interval.

In some embodiments, when the polarity inversion timing is detected after the detection prediction interval is set and before the set detection prediction interval is started, the drive control signal generator may maintain the variable target frequency at the first frequency for the detection prediction interval.

In some embodiments, the drive voltage supply may generate, as the drive voltage for each of the phases, a voltage including a pulse train according to the drive control signal and a predetermined dead time inserted into the pulse train, and the detector may detect the polarity inversion timing based on a relationship between a pulse width of the terminal voltage generated by the drive voltage at the one end of the predetermined coil of the predetermined phase and a pulse width of the drive control signal generated for the predetermined phase.

In some embodiments, for each of the phases, the drive voltage supply may include a half bridge circuit including a high side transistor and a low side transistor connected to each other in series, and supply the drive voltage to the corresponding one of the coils from a connection node between the high side transistor and the low side transistor. For each of the phases, both of the high side transistor and the low side transistor may be turned off in the dead time.

In some embodiments, for each of the phases, the drive voltage supply may include a half bridge circuit including a high side transistor and a low side transistor connected to each other in series, and supply the drive voltage to the corresponding one of the coils from a connection node between the high side transistor and the low side transistor. At least for the predetermined phase, the motor driver device may further include: a high side off detection circuit configured to detect whether or not the high side transistor is in an off state; a low side off detection circuit configured to detect whether or not the low side transistor is in an off state; and a voltage comparison circuit configured to compare a voltage at the connection node between the high side transistor and the low side transistor with a predetermined voltage. The detector may detect the polarity inversion timing based on the detection result of the high side off detection circuit, the detection result of the low side off detection circuit, and the comparison result of the voltage comparison circuit.

In some embodiments, the prediction processor may predict a timing at which a polarity inversion timing before being detected arrives based on the two or more previously detected polarity inversion timings, and set an interval including the predicted timing as the detection prediction interval.

In some embodiments, the motor driver device may switchingly drive a spindle motor that rotates a magnetic disk of a magnetic disk drive as the brushless DC motor.

A second aspect of the present disclosure provides a semiconductor device that forms the motor driver device of the first aspect, wherein the motor driver device is formed using an integrated circuit.

BRIEF DESCRIPTION OF DRAWINGS

FIG. 7 is a waveform diagram of several signals and voltages involved in the SPM driver.

FIG. 11 is an explanatory view of frequency variable control according to the first example of the present disclosure.

FIG. 12 is an operation explanatory view of a first case related to wave number variable control according to the first example of the present disclosure.

FIG. 13 is an operation explanatory view of a second case related to wave number variable control according to the first example of the present disclosure.

DETAILED DESCRIPTION

Figure 1:
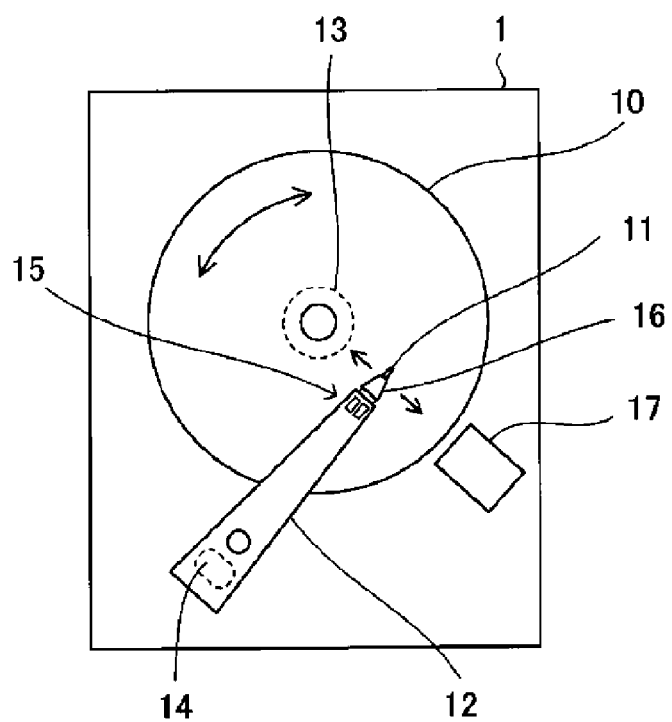
FIG. 1 is a schematic configuration view of a mechanism of a hard disk drive device according to an embodiment of the present disclosure.

Embodiments of the present disclosure will be now described in detail with reference to the drawings. Throughout the drawings, the same parts are denoted by the same reference numerals and explanation thereof will not be repeated in principle. In the present disclosure, for the purpose of simplification of description, by denoting information, signals, physical quantities, members, and the like with reference symbols or marks, the names of information, signals, physical quantities, members, and the like corresponding to the symbols or marks may be omitted or abbreviated. For example, a high side transistor referred to by "TrH" described later may be described as a high side transistor TrH or abbreviated as a transistor TrH, but they all refer to the same thing.

First, several terms used in the present embodiment will be described. In the present embodiment, a level refers to the level of a potential and a high level of any signal or voltage has a potential higher than a low level thereof. A ground refers to a conductive portion having a reference potential of 0 V (zero volt) or refers to the reference potential itself. In the present embodiment, a voltage shown without providing any reference represents a potential seen from the ground. For any transistor configured as a field effect transistor (FET) including transistors TrH and TrL described later, an on state indicates that a drain and a source of the corresponding transistor are in a conducting state, and an off state indicates that the drain and the source of the corresponding transistor are in a non-conducting state (cut-off state). The on state and the off state may be expressed simply as on and off. In any signal or voltage, switching from a low level to a high level is referred to as up-edge, and a timing of switching from the low level to the high level is referred to as an up-edge timing. Similarly, in any signal or voltage, switching from a high level to a low level is referred to as a down-edge, and a timing of switching from the high level to the low level is referred to as a down-edge timing. For any signal or voltage having a level periodically switching between a low level and a high level, a ratio of a length of an interval in which the signal or voltage is at a high level to a length of an interval of one cycle of the signal or voltage is called a duty.

FIG. 1 is a schematic configuration view of a mechanism of a hard disk drive device (hereinafter referred to as an HDD device) 1 as a magnetic disk drive device according to an embodiment of the present disclosure.

The HDD device 1 includes a magnetic disk 10 which is a recording medium, a magnetic head 11 (hereinafter also referred to as a head 11) that writes and reads information in and from the magnetic disk 10, an arm 12 that movably supports the magnetic head 11 in the radial direction of the magnetic disk 10, a spindle motor 13 (hereinafter also referred to as an SPM 13) that supports and rotates the magnetic disk 10, and a voice coil motor 14 (hereinafter also referred to as a VCM 14) that moves and positions the magnetic head 11 in the radial direction of the magnetic disk 10 by rotationally driving and positioning the arm 12.

The HDD device 1 further includes a pair of piezoelectric elements 15, a load beam 16, and a ramp 17 where the magnetic head 11 is held at a predetermined retracted position spaced from the magnetic disk 10. The load beam 16 may be attached to the tip end of the arm 12, and the magnetic head 11 may be attached to the tip end of the load beam 16. At a tip end portion of the arm 12, the pair of piezoelectric elements 15 is disposed near a mounting portion of the load beam 16. By applying voltages of opposite phases to the pair of piezoelectric elements 15, the pair of piezoelectric elements 15 expands and contracts in opposite phases so as to displace the magnetic head 11 at the tip end of the load beam 16 in the radial direction of the magnetic disk 10.

As described above, the HDD device 1 adopts a so-called two-stage actuator system. The VCM 14 functions as a coarse movement actuator for positioning the magnetic head 11 coarsely (positioning the magnetic head 11 with relatively coarse resolution) over the magnetic disk 10 by driving the arm 12, and the pair of piezoelectric elements 15 functions as a fine movement actuator for positioning the magnetic head 11 precisely (positioning the magnetic head 11 with finer resolution than the VCM 14) over the magnetic disk 10 by adjusting the position of the magnetic head 11 based on the position of the arm 12. Hereinafter, an actuator including the pair of piezoelectric elements 15 is referred to as a microactuator (MA) 15.

The magnetic disk 10, the magnetic head 11, the arm 12 to which the MA 15 and the load beam 16 are attached, the SPM 13, the VCM 14, and the ramp 17 are housed in a housing of the HDD device 1. Further, the movement and displacement of the magnetic head 11 by the VCM 14 or the MA 15 in the radial direction of the magnetic disk 10 means movement and displacement of the magnetic head 11 in a direction connecting the circumference and the center of the magnetic disk 10 having a disk shape. However, the movement and displacement of the magnetic head 11 by the VCM 14 or the MA 15 may include components of movement and displacement in other directions (e.g., a tangential direction of the circumference of the magnetic disk 10) in addition to the movement and displacement in the radial direction of the magnetic disk 10.

Figure 2:
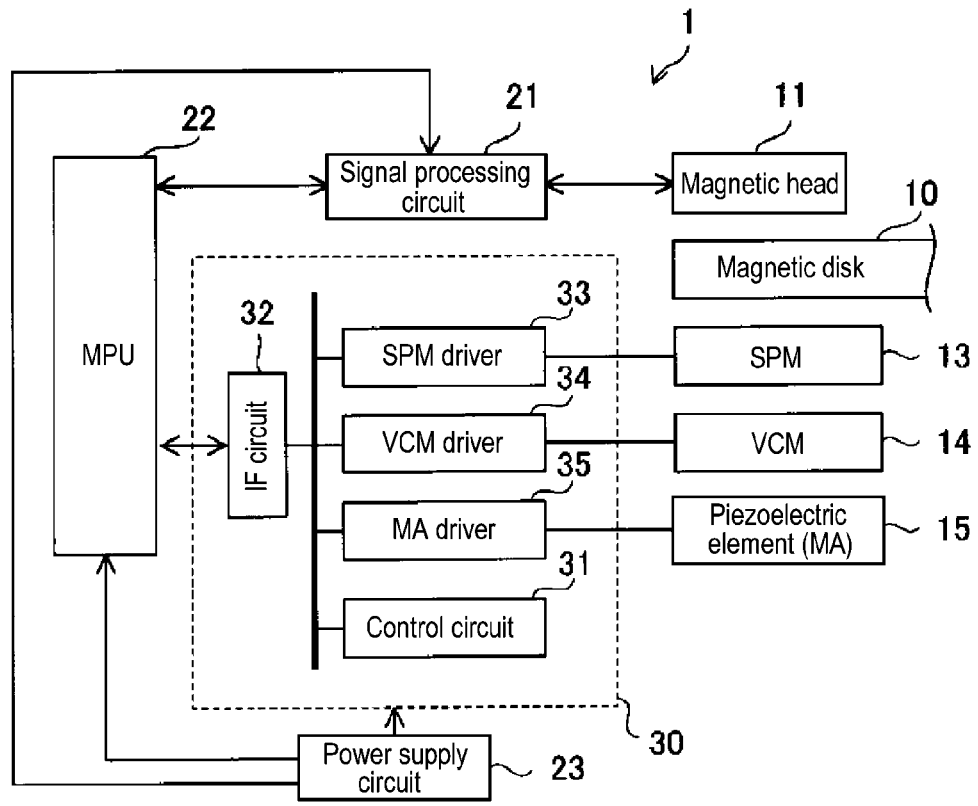
FIG. 2 is a schematic electrical block diagram of the hard disk drive device according to the embodiment of the present disclosure.

FIG. 2 is a schematic electrical block diagram of the HDD device 1. The HDD device 1 is provided with a driver IC 30, a signal processing circuit 21, a micro-processing unit (MPU) 22, and a power supply circuit 23 as electrical components. The power supply circuit 23 supplies power supply voltages for driving the driver IC 30, the signal processing circuit 21, and the MPU 22. The MPU 22 is connected to each of the signal processing circuit 21 and the driver IC 30 to enable bi-directional communication.

The signal processing circuit 21 outputs a recording signal for writing information in the magnetic disk 10 to the magnetic head 11, performs signal processing required for a signal read from the magnetic disk 10 when reading the information from the magnetic disk 10, and sends a signal obtained by the signal processing to the MPU 22. The MPU 22 controls the write operation and the read operation of information by the magnetic head 11 through control of the signal processing circuit 21.

Figure 3:
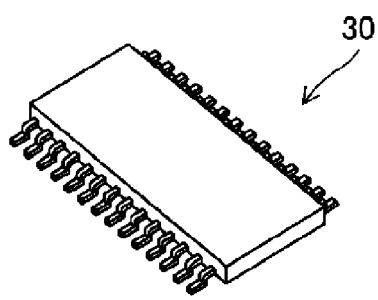
FIG. 3 is an external perspective view of a driver IC mounted on the hard disk drive device according to the embodiment of the present disclosure.

The driver IC 30 is an electronic component (driver device) formed by sealing a semiconductor integrated circuit in a housing (package) made of resin, as shown in FIG. 3. The number of pins (the number of external terminals) of the driver IC 30 shown in FIG. 3 is merely an example. The driver IC 30 is provided with an SPM driver 33 for driving and controlling the SPM 13, a VCM driver 34 for driving and controlling the VCM 14, and an MA driver 35 for driving and controlling the MA 15. The driver IC 30 is further provided with an IF circuit (interface circuit) 32 for enabling bi-directional communication between the MPU 22 and the driver IC 30, and a control circuit 31 for controlling the operations of the drivers 33 to 35 based on control data received from the MPU 22 through the IF circuit 32.

The MPU 22 performs rotation control of the magnetic disk 10 through the drive control of the SPM 13 by controlling the SPM driver 33 of the driver IC 30, and performs movement control and positioning of the magnetic head 11 through the drive control of the VCM 14 and the MA 15 by controlling the VCM driver 34 and the MA driver 35 of the driver IC 30. Position information indicating each position on the magnetic disk 10 is recorded at each location of the magnetic disk 10. When the magnetic head 11 is positioned over the magnetic disk 10, this position information is read by the magnetic head 11 and is transmitted to the MPU 22 through the signal processing circuit 21. The MPU 22 can control the VCM driver 34 and the MA driver 35 based on the position information. Through this control, the VCM driver 34 supplies a necessary driving current to the VCM 14 to realize positioning of a first stage of the magnetic head 11 and the MA driver 35 supplies a necessary voltage to the MA 15 to realize positioning of a second stage of the magnetic head 11. Note that the location of the magnetic head 11 over the magnetic disk 10 means that the magnetic head 11 is located above the magnetic disk 10 with a minute space between the magnetic disk 10 and the magnetic head 11.

In a state where the position information is not read by the magnetic head 11, such as when the magnetic head 11 is located outside the circumference of the magnetic disk 10, the MPU 22 can control the VCM driver 34 and the MA driver 35 without relying on the position information. For example, when moving the magnetic head 11 over the magnetic disk 10 from a retracted position in the ramp 17, the MPU 22 may output to the driver IC 30 a signal instructing supply of a predetermined driving current suitable for the movement to the VCM 14. Thus, the VCM driver 34 supplies a predetermined driving current to the VCM 14 based on the signal. In the state where the position information is not read by the magnetic head 11, since precise position control of the magnetic head 11 is not necessary, the supply voltage to the pair of piezoelectric elements 15 may be zero or a fixed voltage.

Figure 4:
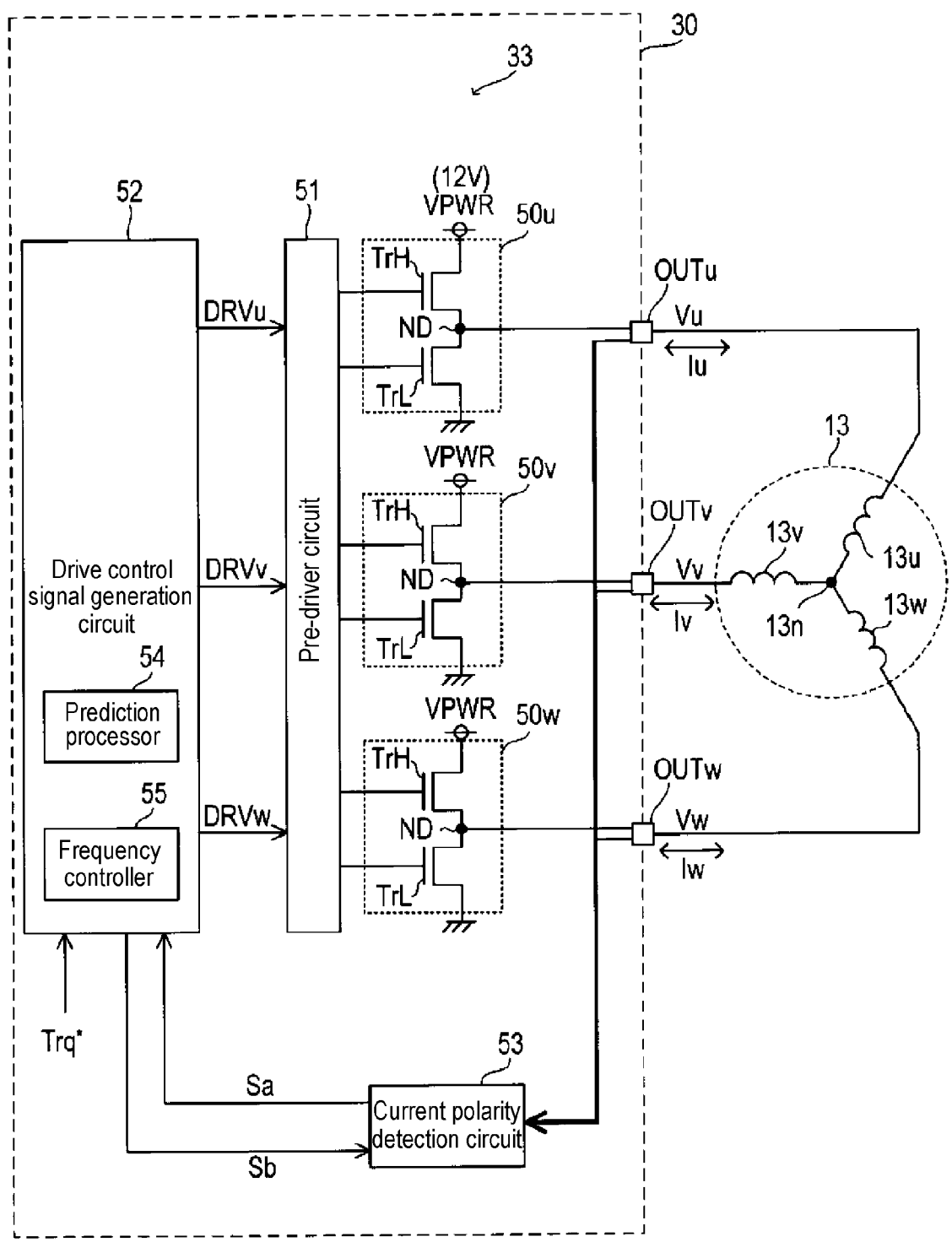
FIG. 4 is a configuration view of an SPM and an SPM driver according to an embodiment of the present disclosure.

FIG. 4 shows the internal configuration of the SPM 13 and the SPM driver 33 and their connection relationship. The external terminals provided in the driver IC 30 include terminals OUTu, OUTv, and OUTw. The SPM 13 is a three-phase brushless DC motor including a star-connected U-phase coil $13u$, a V-phase coil $13v$, and a W-phase coil $13w$. The SPM 13 has a stator and a rotor provided with a permanent magnet, and the stator is provided with the coils $13u$, $13v$, and $13w$. One end of the coil $13u$, one end of the coil $13v$, and one end of the coil $13w$ are respectively connected to the external terminals OUTu, OUTv, and OUTw, and the other ends of the coils $13u$, $13v$, and $13w$ are connected in common to a neutral point $13n$. The external terminals OUTu, OUTv, and OUTw may also be referred to as output terminals. In the description below, when simply written as a rotor, it refers to the rotor of the SPM 13.

The SPM driver 33 includes a U-phase half bridge circuit $50u$, a V-phase half bridge circuit $50v$, a W-phase half bridge circuit $50w$, a pre-driver circuit 51, a drive control signal generation circuit 52, and a current polarity detection circuit 53, and drives the SPM 13 sensorlessly in a windowless method. The SPM driver 33 may also drive the SPM 13 by a 180-degree conduction method (sinusoidal wave drive).

Each of the half bridge circuits $50u$, $50v$, and $50w$ includes a high side transistor TrH and a low side transistor TrL connected in series between a line to which a power supply voltage VPWR is applied and the ground. The transistors TrH and TrL are configured as N-channel metal oxide semiconductor field effect transistors (MOSFETs). The power supply voltage VPWR is a predetermined positive DC voltage, which is 12 V (volt) as an example here.

More specifically, in each of the half bridge circuits $50u$, $50v$, and $50w$, the drain of the transistor TrH is connected to a first power supply terminal to which the power supply voltage VPWR is applied, and receives the supply of power supply voltage VPWR. The source of the transistor TrH and the drain of the transistor TrL are connected in common to a node ND. The source of the transistor TrL is connected to the ground functioning as a second power supply terminal. The nodes ND in the half bridge circuits $50u$, $50v$, and $50w$ are connected to the output terminals OUTu, OUTv, and OUTw, respectively. Therefore, the nodes ND in the half bridge circuits $50u$, $50v$, and $50w$ are respectively connected to the one ends of the coils $13u$, $13v$, and $13w$ via the output terminals OUTu, OUTv, and OUTw, respectively. Voltages applied to the output terminals OUTu, OUTv, and OUTw, which correspond respectively to the voltages at the one ends of the coils $13u$, $13v$, and $13w$, are represented by Vu, Vv, and Vw, respectively. The voltages Vu, Vv, and Vw are respectively supplied to the coils $13u$, $13v$, and $13w$ as drive voltages for U-phase, V-phase, and W-phase by the pre-driver circuit 51 and the half bridge circuits $50u$, $50v$, and $50w$.

In order to realize the sensorless driving of the SPM 13, the current polarity detection circuit 53 performs at least one of a U-phase polarity detection process for detecting the polarity of a current flowing through the coil $13u$ based on the voltage Vu, a V-phase polarity detection process for detecting the polarity of a current flowing through the coil $13v$ based on the voltage Vv, and a W-phase polarity detection process for detecting the polarity of a current flowing through the coil $13w$ based on the voltage Vw. The detection result by the polarity detection process is sent to the drive control signal generation circuit 52 as a polarity detection signal Sa.

The currents flowing through the output terminals OUTu, OUTv, and OUTw to the coils $13u$, $13v$, and $13w$ are referred to as coil currents, which are respectively denoted by Iu, Iv, and Iw. Regarding the coil current Iu, the polarity of the coil current Iu flowing from the node ND of the half bridge circuit $50u$ to the coil $13u$ via the output terminal OUTu is defined as positive, and the opposite polarity is defined as negative. The polarities of the coil currents Iv and Iw are similarly defined. The positive direction of a coil current is also referred to as a source direction, and the negative direction of the coil current is also referred to as a sink direction.

Although FIG. 4 shows the state where the output terminals OUTu, OUTv, and OUTw are connected to the current polarity detection circuit 53, only one or two of the output terminals may be connected to the current polarity detection circuit 53. For example, when only the U-phase polarity detection process is executed by the current polarity detection circuit 53, it is sufficient to connect only the output terminal OUTu among the output terminals OUTu, OUTv, and OUTw to the current polarity detection circuit 53.

The drive control signal generation circuit 52 generates and outputs a drive control signal DRVu for the half bridge circuit $50u$, a drive control signal DRVv for the half bridge circuit $50v$, and a drive control signal DRVw for the half bridge circuit $50w$ based on the polarity detection signal Sa containing phase information of a coil current (in other words, positional information of the rotor). A torque command signal Trq* specifying a torque to be generated by the SPM 13 is supplied to the drive control signal generation circuit 52, and the drive control signal generation circuit 52 generates the drive control signals DRVu, DRVv, and DRVw so that the torque specified by the torque command signal Trq* is generated in the SPM 13. At this time, the drive control signals DRVu, DRVv, and DRVw may be generated so that sinusoidal currents flow in the coils 13u, 13v, and 13w by referring to predetermined waveform data. Each of the drive control signals DRVu, DRVv, and DRVw is a binary signal having a variable pulse width, and takes a high level or a low level. A control pulse width signal Sb sent from the drive control signal generation circuit 52 to the current polarity detection circuit 53, and a prediction processor 54 and a frequency controller 55 contained in the drive control signal generation circuit 52 will be described later.

The pre-driver circuit 51 controls the state of each half bridge circuit by controlling the gate potential of each of the transistors in the half bridge circuits 50u, 50v, and 50w according to the drive control signals DRVu, DRVv, and DRVw. Thereby, voltages obtained by switching the power supply voltage VPWR according to the drive control signals DRVu, DRVv, and DRVw are applied as the drive voltages Vu, Vv, and Vw to the output terminals OUTu, OUTv, and OUTw, respectively, to switchingly drive the SPM 13. In a target half bridge circuit which is any one of the half bridge circuits 50u, 50v, and 50w, a state where the transistor TrH is turned on and the transistor TrL is turned off is referred to as an output high state, and a state where the transistor TrH is turned off and the transistor TrL is turned on is referred to as an output low state. Assuming that the on resistances of the transistors TrH and TrL are zero, for example, when the half bridge circuit 50u is in the output high state, the power supply voltage VPWR is applied to the output terminal OUTu via the high side transistor TrH. When the half bridge circuit 50u is in the output low state, the ground potential is applied to the output terminal OUTu via the low side transistor TrL (here, the transient state is ignored). The same applies to the half bridge circuits 50v and 50w.

Now, a detailed operation of the SPM driver 33 will be described by taking, as an example, a case where the drive control signal generation circuit 52 generates pulse width-modulated signals as the drive control signals DRVu, DRVv, and DRVw. Here, it is assumed that the U-phase polarity detection processing is performed by the current polarity detection circuit 53.

Figure 5:
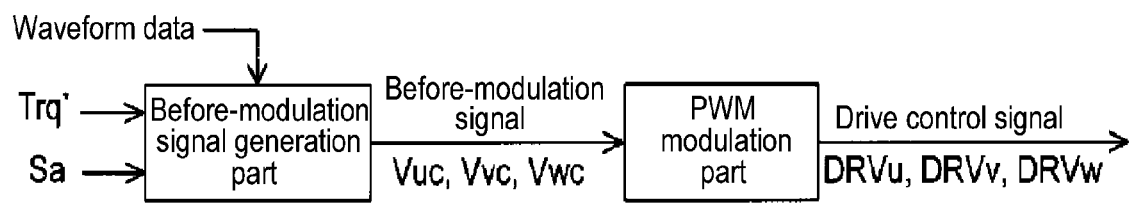
FIG. 5 is a functional block diagram related to generation of a drive control signal in a drive control signal generation circuit.

FIG. 5 is a functional block diagram related to generation of a drive control signal in the drive control signal generation circuit 52. The drive control signal generation circuit 52 generates before-modulation signals Vuc, Vvc, and Vwc based on the polarity detection signal Sa, the torque command signal Trq*, and the predetermined waveform data, and generates the drive control signals DRVu, DRVv, and DRVw by performing pulse width modulation on the before-modulation signals Vuc, Vvc, and Vwc. The before-modulation signals Vuc, Vvc, and Vwc indicate voltages to be applied to the output terminals OUTu, OUTv, and OUTw, respectively, in order to flow sinusoidal coil currents Iu, Iv, and Iw, and have an amplitude corresponding to the signal Trq*.

Figure 6:
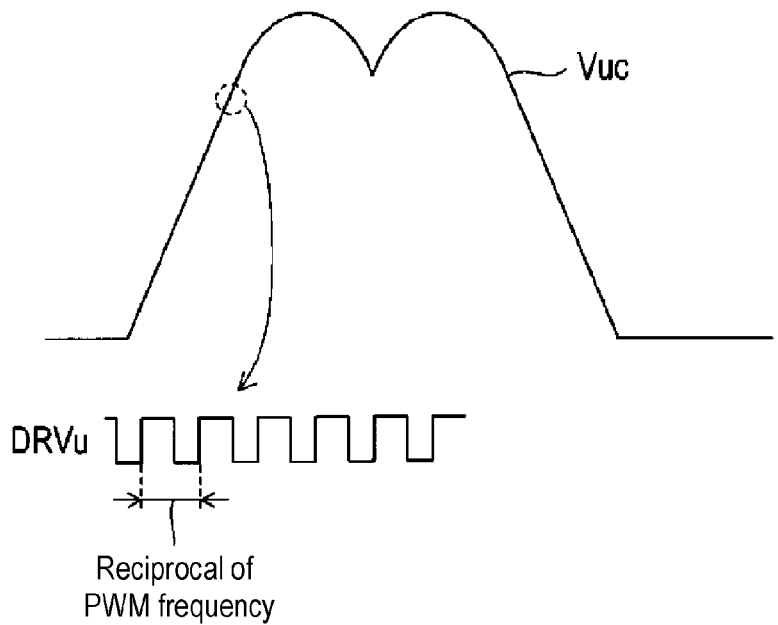
FIG. 6 is a schematic waveform diagram of a before-modulation signal and a drive control signal regarding a U phase.

FIG. 6 shows schematic waveforms of the before-modulation signal Vuc and the pulse-width-modulated drive control signal DRVu. The drive control signal DRVu is a pulse width modulation signal having a predetermined PWM frequency, and is a binary signal having a cycle, which is the reciprocal of the PWM frequency. The same applies to the drive control signals DRVv and DRVw.

The pre-driver circuit 51 generates the drive voltages Vu, Vv, and Vw, which are pulse trains having duties according to the drive control signals DRVu, DRVv, and DRVw, respectively, and into each of which a predetermined dead time $T_D$ is inserted. The pre-driver circuit 51 supplies the generated drive voltages Vu, Vv, and Vw to the output terminals OUTu, OUTv, and OUTw (i.e., the one ends of the coils 13u, 13v, and 13w). In each phase, in the dead time $T_D$ (in a dead time interval having a time length corresponding to the dead time $T_D$), both of the transistors TrH and TrL are turned off.

FIG. 7 shows waveforms of the drive control signal DRVu, gate signals $V_{GH}$ and $V_{GL}$ supplied to the gates of the transistors TrH and TrL of the U-phase half bridge circuit 50u, and the drive voltage Vu. In this embodiment, in each cycle of the drive control signal DRVu, it is assumed that the gate signal $V_{GH}$ has a high level for a time shorter by the dead time $T_D$ than the time when the drive control signal DRVu has a high level, and the gate signal $V_{GL}$ has a high level for a time shorter by the dead time $T_D$ than the time when the drive control signal DRVu has a low level. The U-phase half bridge circuit 50u is in the output high state when the gate signal $V_{GH}$ is at the high level, and is in the output low state when the gate signal $V_{GL}$ is at the high level.

The description will be given starting from an output low interval in which the drive control signal DRVu and the gate signal $V_{GH}$ are at the low level and the gate signal $V_{GL}$ is at the high level. The transistors TrH and TrL are in the off state and the on state, respectively, in the output low interval. When an up-edge occurs in the drive control signal DRVu starting from the output low interval, the output low interval transits to a first dead time interval. In the first dead time interval, the drive control signal DRVu is at the high level, and the gate signal $V_{GL}$ has the low level in response thereto, but the gate signal $V_{GH}$ remains at the low level. When the dead time $T_D$ elapses from the start of the first dead time interval, the first dead time interval shifts to an output high interval in which the drive control signal DRVu and the gate signal $V_{GH}$ are at the high level and the gate signal $V_{GL}$ is at the low level. The transistors TrH and TrL are in the on state and the off state, respectively, in the output high interval. Thereafter, when a down-edge occurs in the drive control signal DRVu, the output high interval transits to a second dead time interval. In the second dead time interval, the drive control signal DRVu is at the low level, and the gate signal $V_{GH}$ has the low level in response thereto, but the gate signal $V_{GL}$ remains at the low level. When the dead time $T_D$ elapses from the start of the second dead time interval, the second dead time interval shifts to an output low interval. In this manner, the output low interval, the first dead time interval, the output high interval, and the second dead time interval are repeatedly traversed in this order. The time length of each of the first and second dead time intervals coincides with the predetermined dead time $T_D$, and the transistors TrH and TrL are both turned off in the first and second dead time intervals.

Figure 8A:
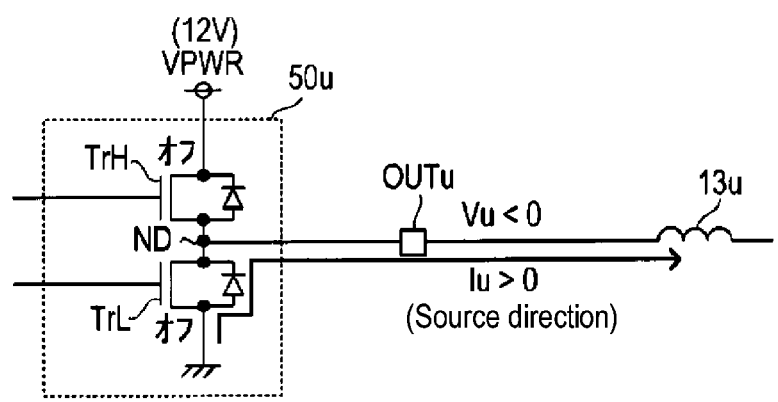
FIGS. 8A and 8B are views showing a flow of a coil current in a dead time interval.
Figure 8B:
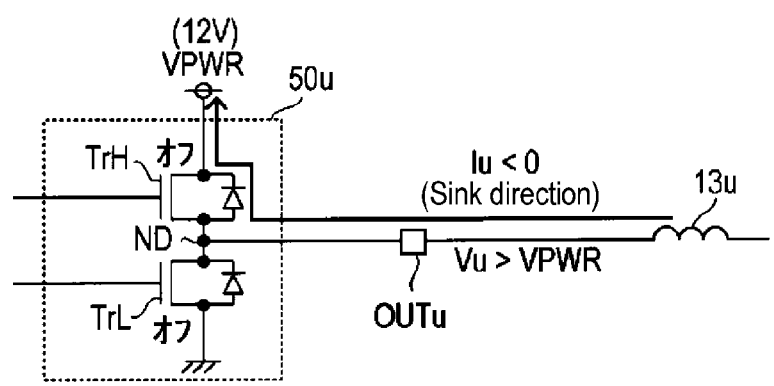

A time Ta represents the pulse width of the drive control signal DRVu and is equal to the time when the drive control signal DRVu goes to the high level in each cycle of the drive control signal DRVu. On the other hand, a time Tb represents the pulse width of the voltage Vu and is equal to the time when the voltage Vu goes to the high level in each cycle of the voltage Vu (the time when the voltage Vu is equal to or higher than a predetermined threshold voltage). Here, as shown in FIG. 8A, when the polarity of the coil current Iu is positive, since a current flows from the half bridge circuit 50u to the coil 13u through a parasitic diode of the transistor TrL of the half bridge circuit 50u in each dead time period (i.e., since a current flows in the source direction), the terminal voltage Vu at one end of the coil 13u becomes lower by the forward voltage of the parasitic diode than 0 V. As a result, the time Tb is shorter than the time Ta. On the other hand, as shown in FIG. 8B, when the polarity of the coil current Iu is negative, since the coil current Iu flows from the coil 13u to the half bridge circuit 50u in each dead time interval and flows through the parasitic diode of the transistor TrH to the terminal to which the power supply voltage VPWR is applied (i.e., since a current flows in the sink direction), the terminal voltage Vu at the one end of the coil 13u becomes higher by the forward voltage of the parasitic diode than the power supply voltage VPWR. As a result, the time Tb is longer than the time Ta.

Using the above-described characteristics, the polarity of the coil current Iu can be detected by comparing the pulse width (i.e., the time Ta) of the drive control signal DRVu with the pulse width (i.e., the time Tb) of the voltage Vu. Specifically, the current polarity detection circuit 53 performs the above comparison. When "Tb<Ta," the current polarity detection circuit 53 determines that the polarity of the coil current Iu is positive, and outputs the polarity detection signal Sa of a high level. When "Tb>Ta," the current polarity detection circuit 53 determines that the polarity of the coil current Iu is negative, and outputs the polarity detection signal Sa of a low level.

As the pulse width of the drive control signal DRVu and the pulse width of the voltage Vu, a time Tc when the drive control signal DRVu is at the low level and a time Td when the voltage Vu is at the low level may be used to detect the polarity of the coil current Iu. A signal indicating the pulse width (the time Ta or Tc) of the drive control signal DRVu is sent as the control pulse width signal Sb from the drive control signal generation circuit 52 to the current polarity detection circuit 53 (see FIG. 4). The current polarity detection circuit 53 recognizes the pulse width of the drive control signal DRVu based on the signal Sb. The current polarity detection circuit 53 can obtain the time Tb or Td using a comparator that compares the voltage Vu with a predetermined threshold voltage (a voltage of 0 V or more and the power supply voltage VPWR or less, for example, 1 V).

The switching of the level of the polarity detection signal Sa represents a timing at which the polarity of the coil current Iu is inverted (hereinafter referred to as a polarity inversion timing). The polarity inversion timing is also a zero-cross timing at which the value of the coil current Iu crosses zero. Since the polarity inversion of the coil current Iu occurs every 180 degrees of the phase of the coil current Iu, the polarity detection signal Sa is a signal indicating the phase of the coil current Iu. Therefore, it is possible to drive the SPM 13 sensorlessly based on the polarity detection signal Sa. It can be said that the current polarity detection circuit 53 is a circuit that detects the polarity inversion timing and indicates the result of the detection at the up-edge or the down-edge of the signal Sa.

The polarity inversion timing includes a negative transition timing at which the polarity of the coil current Iu transitions from positive to negative and a positive transition timing at which the polarity of the coil current Iu transitions from negative to positive. The current polarity detection circuit 53 may detect both of the negative transition timing and the positive transition timing as the polarity inversion timing, or may detect only one of them as the polarity inversion timing. In the following, it is assumed that only the positive transition timing is detected as the polarity inversion timing. Then, the up-edge timing of the polarity detection signal Sa is detected as the polarity inversion timing.

The detailed configuration examples, operation examples, application examples, and modifications of the HDD device 1 (in particular, the drive control signal generation circuit 52 and the current polarity detection circuit 53) based on the above contents will be described below in the first to fifth examples. In particular, unless stated otherwise or contradictory, the matters described above in the present embodiment are applied to the first to fifth examples to be described below, and with respect to matters in the first to fifth examples that are contradictory to the above contents, the description in the first to fifth examples is given priority. Further, unless contradictory, the matters described in any of the first to fifth examples described below can be applied to any other examples (that is to say, two or more of the first to fifth examples can be used in combination).

First Example

A first example will be described. The drive control signal generation circuit 52 is supplied with a predetermined reference clock having a predetermined clock frequency, and uses the reference clock to generate the drive control signals DRVu, DRVv, and DRVw in a digital domain. That is to say, the pulse width of each drive control signal is adjusted in a unit that is reciprocal of the clock frequency. Here, for the purpose of substantiation of the description, it is considered that the clock frequency is 20 MHz (megahertz). Then, the pulse width of each drive control signal varies with 50 ns (nanosecond), which is the reciprocal of 20 MHz, as the minimum adjustment unit.

On the other hand, the sampling frequency for current polarity detection by the current polarity detection circuit 53 depends on the PWM frequency, which is the frequency of pulse width modulation in the drive control signal generation circuit 52 in principle. The PWM frequency used herein corresponds to the frequency of the drive control signals DRVu, DRVv, and DRVw. As described above with reference to FIG. 18, when the PWM frequency is increased, since the sampling frequency for polarity detection of a current is increased, the resolution of polarity detection of the current (in other words, detection resolution of polarity inversion timing) increases. However, simply increasing the PWM frequency decreases the resolution of each drive control signal. The decrease in resolution of the drive control signal leads to an increase in torque ripple of the SPM 13.

Taking this into consideration, the drive control signal generation circuit 52 according to the present embodiment performs characteristic control to improve the resolution of current polarity detection while suppressing a decrease in resolution of a drive control signal. This characteristic control will be described below.

Figure 9:
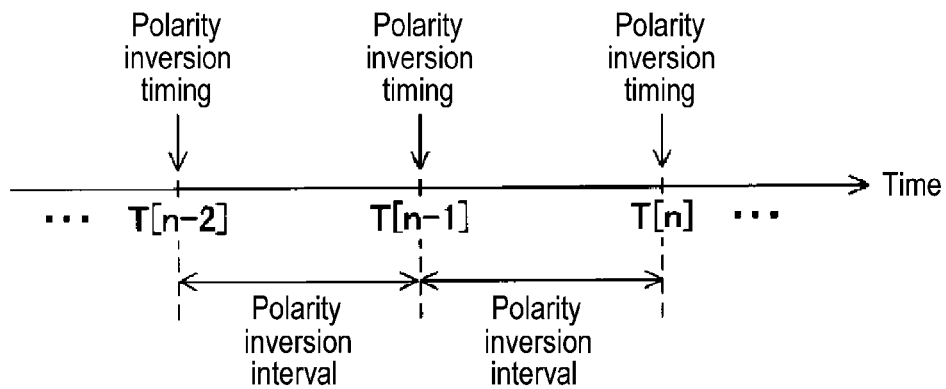
FIG. 9 is diagram showing a relationship among a plurality of polarity inversion timings.

As shown in FIG. 9, now, a polarity inversion timing coming at the i-th time is represented by "T[i]" (where i is an integer). Then, as time advances, the polarity inversion timings T[1], T[2], T[3], . . . , T[n−2], T [n−1], T[n] (where n is an integer of three or more) are sequentially traversed. In the steady state of rotation of the SPM 13, since an interval between two temporally adjacent polarity inversion timings (hereinafter referred to as a polarity inversion interval) is substantially constant, it is possible to predict a polarity inversion timing that will come in the future, based on a plurality of detected polarity inversion timings.

The prediction processor 54 performs the above prediction. The prediction processor 54 predicts a timing at which the next polarity inversion will occur, based on two or more detected polarity inversion timings. More specifically, the prediction processor 54 may predict the next polarity inversion timing before being detected, based on polarity inversion intervals for the most recent past $VAL_A$ times (where $VAL_A$ is an integer of one or more) and the polarity inversion timing detected most recently. The timing predicted here is referred to as a "polarity inversion prediction timing," and a polarity inversion prediction timing for the i-th polarity inversion timing is represented by "$T_{EST}[i]$."

Typically, for example, an average value of the polarity inversion intervals for the most recent past $VAL_A$ times may be obtained, and a timing after a time of the average value from the most recently detected polarity inversion timing may be derived as the polarity inversion prediction timing. That is to say, referring to FIG. 10A, for example, when "$VAL_A=3$," before arrival of the polarity inversion timing T[n] after detection of the polarity inversion timings T[n−3] to T[n−1], the prediction processor 54 obtains an average value of the interval between the timing T[n−3] and T[n−2] and the interval between the timing T[n−2] and T[n−1], and derives a timing after a time of the average value from the timing T[n−1] as the polarity inversion prediction timing $T_{EST}[n]$.

Figure 10A:
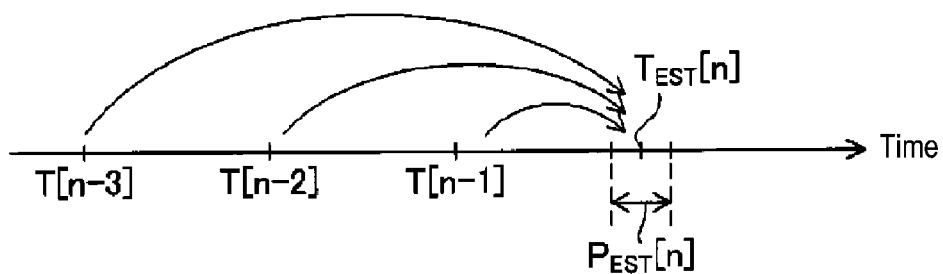
FIGS. 10A and 10B are explanatory views of a polarity inversion prediction timing and a detection prediction interval according to a first example of the present disclosure.
Figure 10B:
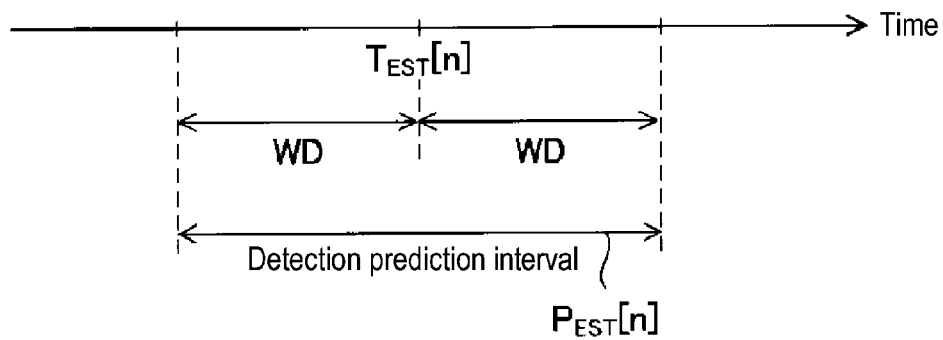

After deriving the polarity inversion prediction timing, the prediction processor 54 sets a detection prediction interval centered on the polarity inversion prediction timing and having a time width of "2×WD," where WD is a time (time length) predetermined to be sufficiently shorter than the polarity inversion interval. The detection prediction interval centered on the polarity inversion prediction timing $T_{EST}[i]$ is represented by "$P_{EST}[i]$." FIGS. 10A and 10B show a detection prediction interval $P_{EST}[n]$, and FIG. 10B is an enlarged view of the detection prediction interval $P_{EST}[n]$.

The frequency controller 55 can perform a frequency variable control on the PWM frequency, which is the frequency of the drive control signals DRVu, DRVv, and DRVw, as a variable target frequency. As shown in FIG. 11, the frequency variable control refers to a control for setting the variable target frequency (in this case, the PWM frequency) to a predetermined frequency $f_L$ outside the detection prediction interval, while setting the variable target frequency to a predetermined frequency $f_H$ higher than the frequency $f_L$ within the detection prediction interval. When the reference clock is 20 MHz, for example, the frequency $f_L$ may be 150 kHz and the frequency $f_H$ may be 400 kHz. Of course, the specific numerical values of the frequencies $f_L$ and $f_H$ can be changed variously.

Since the actual polarity inversion timing is likely to be detected within the detection prediction interval, the frequency variable control can substantially improve the resolution of current polarity detection. Further, since the variable target frequency is increased only in the detection prediction interval, the decrease in resolution of the drive control signal is suppressed as compared to a case where the variable target frequency is uniformly increased. That is to say, it is possible to increase the resolution of current polarity detection while suppressing the decrease in resolution of the drive control signal.

The frequency controller 55 may operate as described below based on the frequency variable control. That is to say, when the polarity inversion timing is actually detected in a state where the variable target frequency is set to the frequency $f_H$ in the detection prediction interval, the frequency controller 55 may switch the variable target frequency from the frequency $f_H$ to the frequency $f_L$ in response to the detection (a first case described later; see FIG. 12). In addition, when the polarity inversion timing predicted to be detected in the detection prediction interval is detected before the detection prediction interval is started, the frequency controller 55 may cancel the execution of the frequency variable control for the detection prediction interval and maintain the variable target frequency at the frequency $f_L$ in the detection prediction interval (a third case described later; see FIG. 14).

Operations of the first to third cases involved in the frequency variable control will be described with reference to FIGS. 12 to 14. In the first to third cases, it is assumed that the polarity inversion prediction timing $T_{EST}[n]$ and the detection prediction interval $P_{EST}[n]$ are set by the prediction processor 54, before the arrival of the polarity inversion timing T[n] after the detection of the polarity inversion timing T[n−1]. The start timing and the end timing of the detection prediction interval $P_{EST}[n]$ are represented by "$T_S[n]$" and "$T_E[n]$," respectively. The operations of the first to third cases will be described starting from a timing 610 after the detection of the polarity inversion timing T[n−1] and before the timing $T_S[n]$. Since the polarity detection signal Sa is at the low level at the timing 610 and the timing 610 is a timing outside the detection prediction interval, the variable target frequency at the timing 610 is the frequency $f_L$.

FIG. 12 is an operation explanatory view of the first case related to the frequency variable control. In the first case, an up-edge occurs in the polarity detection signal Sa at a timing 611 in the detection prediction interval $P_{EST}[n]$, and the timing 611 is detected as the actual polarity inversion timing T[n].

In the first case, the frequency controller 55 increases the variable target frequency from the frequency $f_L$ to the frequency $f_H$ at the timing $T_S[n]$ by the frequency variable control, returns the variable target frequency from the frequency $f_H$ to the frequency $f_L$ in response to the detection of the actual polarity inversion timing T[n] at the timing 611, and, after that, maintains the variable target frequency at the frequency $f_L$ until the next detection prediction interval arrives. This is because it is not necessary to increase the variable target frequency after the actual polarity inversion timing is detected, and the decrease in resolution of the drive control signal can be suppressed by quickly returning the variable target frequency to the frequency $f_L$.

FIG. 13 is an operation explanatory view of the second case related to the frequency variable control. In the second case, the polarity inversion timing T[n] does not come between the timing 610 and the timing $T_S[n]$ and does not come also in the detection prediction interval $P_{EST}[n]$. An up-edge occurs in the polarity detection signal Sa at a timing 612 after the end of the detection prediction interval $P_{EST}[n]$, and the timing 612 is detected as the actual polarity inversion timing T[n].

In the second case, the frequency controller 55 increases the variable target frequency from the frequency $f_L$ to the frequency $f_H$ at the timing $T_S[n]$ by the frequency variable control, maintains the variable target frequency at the frequency $f_H$ up to the timing $T_E[n]$, and, after that, returns the variable target frequency from the frequency $f_H$ to the frequency $f_L$ at the timing $T_E[n]$. Thereafter, the variable target frequency is maintained at the frequency $f_L$ until the next detection prediction interval arrives. That is to say, after the start of the detection prediction interval $P_{EST}[n]$, when the detection prediction interval $P_{EST}[n]$ ends without detecting the polarity inversion timing T[n], the frequency controller 55 returns the variable target frequency from the frequency $f_H$ to the frequency $f_L$ in response to the end of the detection prediction interval. The prediction may be missed and the actual polarity inversion timing may not be detected in the detection prediction interval. However, in terms of the resolution of the drive control signal, it is not desirable to maintain the state in which the variable target frequency is increased for a long time. Thus, the variable target frequency is returned to the frequency $f_L$ at the end of the detection prediction interval.

Figure 14:
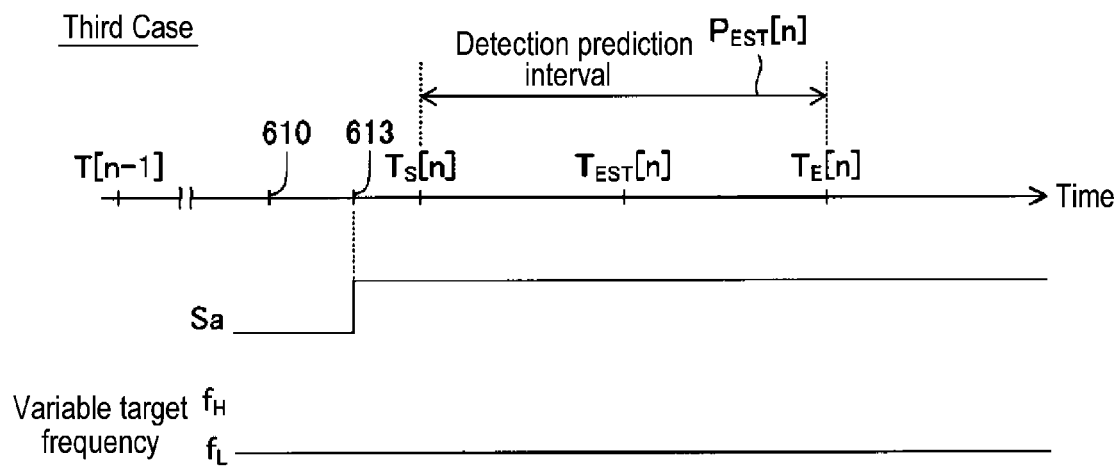
FIG. 14 is an operation explanatory view of a third case related to wave number variable control according to the first example of the present disclosure.

FIG. 14 is an operation explanatory view of the third case related to the frequency variable control. In the third case, an up-edge occurs in the polarity detection signal Sa at a timing 613 before the start timing $T_S[n]$ of the detection prediction interval $P_{EST}[n]$ after the timing 610, and the timing 613 is detected as the actual polarity inversion timing T[n].

In the third case, the frequency controller 55 maintains the variable target frequency at the frequency $f_L$ in the detection prediction interval $P_{EST}[n]$ without executing the frequency variable control on the detection prediction interval $P_{EST}[n]$. This is because, it is not necessary to increase the variable target frequency after the actual polarity inversion timing is detected.

Second Example

A second example will be described. It has been illustrated in the first example that the pulse width modulation is used to generate the drive control signal, but pulse density modulation may be used to generate the drive control signal. In the second example, it is assumed that the pulse density modulation is used to generate the drive control signals DRVu, DRVv, and DRVw. The drive control signal generation circuit 52 according to the second example is configured to be able to change the frequency in the pulse density modulation (hereinafter referred to as a PDM frequency). The pulse density modulation may be abbreviated as PDM. When the pulse density modulation is used, each of the drive control signals DRVu, DRVv, and DRVw is a compressional wave (one-bit compressional wave) as a binary signal, but the reciprocal of the minimum pulse width in the compressional wave corresponds to the PDM frequency (see FIG. 16 described later).

Figure 15:
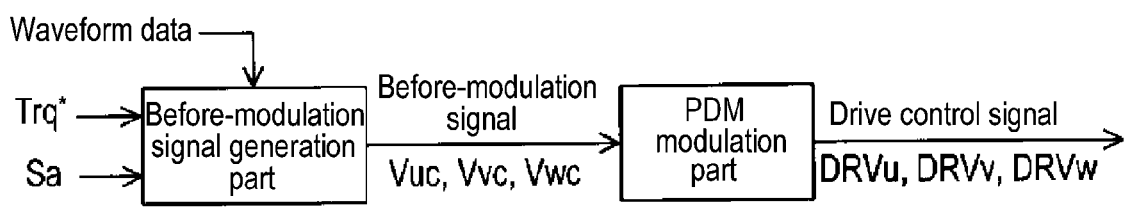
FIG. 15 is a functional block diagram related to generation of a drive control signal in a drive control signal generation circuit according to a second example of the present disclosure.

FIG. 15 is a functional block diagram related to generation of a drive control signal in the drive control signal generation circuit 52. The drive control signal generation circuit 52 generates before-modulation signals Vuc, Vvc, and Vwc based on the polarity detection signal Sa, the torque command signal Trq*, and the predetermined waveform data, and generates drive control signals DRVu, DRVv, and DRVw by performing pulse density modulation on the before-modulation signals Vuc, Vvc, and Vwc. The before-modulation signals Vuc, Vvc, and Vwc indicate voltages to be applied to the output terminals OUTu, OUTv, and OUTw, respectively, in order to flow sinusoidal coil currents Iu, Iv, and Iw, and have an amplitude corresponding to the signal Trq*.

Figure 16:
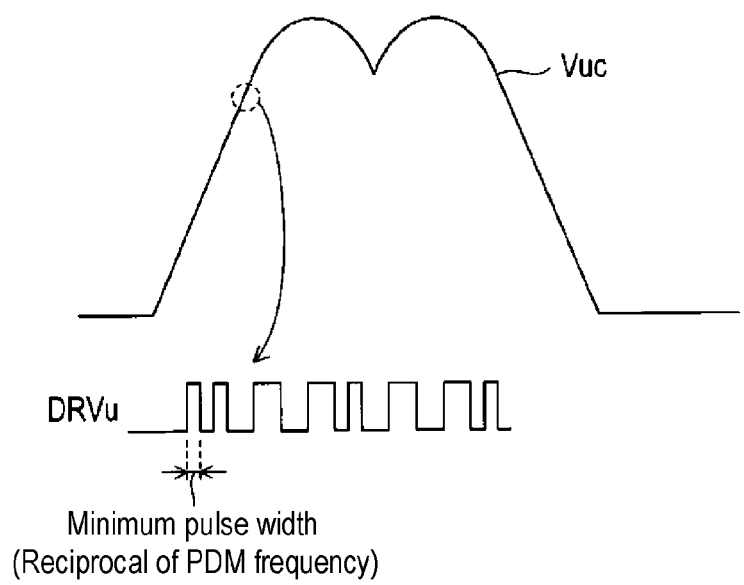
FIG. 16 is a schematic waveform diagram of a before-modulation signal and a drive control signal regarding a U phase according to the second example of the present disclosure.

FIG. 16 shows schematic waveforms of the before-modulation signal Vuc and the pulse-density-modulated drive control signal DRVu. The drive control signal DRVu is a pulse density modulation signal having the reciprocal of the PDM frequency as the minimum pulse width. The same applies to the drive control signals DRVv and DRVw. As in the case of using the pulse width modulation, the drive control signal generation circuit 52 is supplied with a predetermined reference clock having a predetermined clock frequency, and uses the reference clock to generate the drive control signals DRVu, DRVv, and DRVw in a digital domain. That is to say, in the second example, the clock frequency is used as the PDM frequency. When the clock frequency is 20 MHz (megahertz), the pulse width of each drive control signal varies with 50 ns (nanosecond), which is the reciprocal of 20 MHz, as the minimum adjustment unit.

On the other hand, the sampling frequency for current polarity detection by the current polarity detection circuit 53 depends on the PDM frequency in principle. As in the case of using the pulse width modulation, when the PDM frequency is increased, since the sampling frequency for current polarity detection is increased, the resolution of current polarity detection (in other words, detection resolution of polarity inversion timing) increases. However, simply increasing the PDM frequency decreases the resolution of each drive control signal.

Therefore, in the second example, after setting the PDM frequency as the variable target frequency, the same operation as in the first example including the above-described frequency variable control may be performed. The method of setting the polarity inversion prediction timing and the detection prediction interval and the operations of the first to third cases are common to the case of using the pulse width modulation and the case of using the pulse density modulation.

Third Example

A third example will be described. The method of detecting the polarity of the coil current Iu is not limited to that described above. In the third example, another method of detecting the polarity of the coil current Iu will be described. The SPM driver 33 includes a high side off sensor (high side off detection circuit) that detects whether or not the transistor TrH is in an off state with respect to a half bridge circuit among at least one of the U-phase, the V-phase, and the W-phase, a low side off sensor (low side off detection circuit) that detects whether or not the transistor TrL is in an off state, and an output sensor (voltage comparison circuit) that compares a voltage at a connection node between the transistors TrH and TrL with a predetermined voltage.

Figures 17, 18:
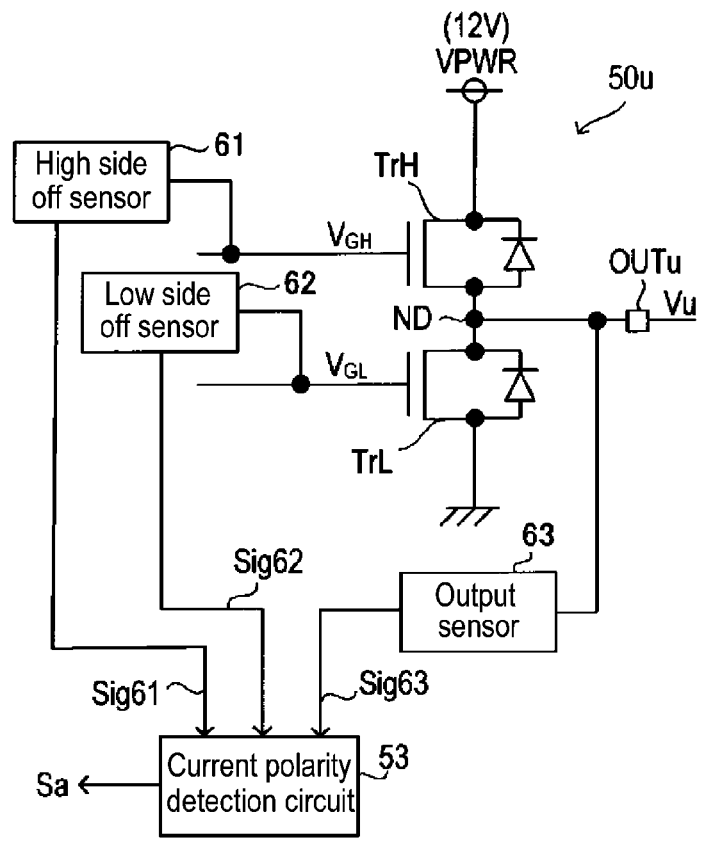
FIG. 17 is a configuration view of a U-phase half bridge circuit and a peripheral circuit according to a third example of the present disclosure.
FIG. 18 is a table showing a relationship among a PWM frequency, a current polarity detection resolution, and a drive control signal resolution according to a related art.

Referring to FIG. 17, it is considered here that the sensors are provided for the U-phase half bridge circuit 50u. That is to say, the SPM driver 33 is provided with sensors 61 to 63 as the sensors for the half bridge circuit 50u. The high side off sensor 61 detects whether or not the transistor TrH is in an off state based on the level of the gate signal $V_{GH}$ of the transistor TrH (that is to say, based on the gate potential of the transistor TrH), and outputs a signal Sig61 indicating the detection result. The low side off sensor 62 detects whether or not the transistor TrL is in an off state based on the level of the gate signal $V_{GL}$ of the transistor TrL (that is to say, based on the gate potential of the transistor TrL), and outputs a signal Sig62 indicating the detection result. The output sensor 63 compares the voltage Vu at the output terminal OUTu with a predetermined voltage, and outputs a signal Sig63 indicating the comparison result. The current polarity detection circuit 53 according to the third example detects the polarity of the coil current Iu based on the signals Sig61 to Sig63, and generates and outputs a polarity detection signal Sa.

Specifically, the output sensor 63 compares the voltage Vu with a predetermined positive voltage $V_{REF1}$ (for example, 0.5 V), which is lower than the power supply voltage VPWR. When there is a timing at which the voltage Vu is equal to or lower than the predetermined voltage $V_{REF1}$ while the transistor TrL is in the off state, the current polarity detection circuit 53 determines that the polarity of the coil current Iu is positive (i.e., determines that the coil current Iu flows in the source direction). When the transistor TrL is turned off while the coil current Iu is flowing in the sink direction, the voltage Vu is sufficiently high. Therefore, when the voltage Vu is lower than the predetermined voltage $V_{REF1}$ while the transistor TrL is turned off, it is considered that the coil current Iu flows in the reverse of the sink direction, that is to say, in the source direction (see FIG. 8A).

Further, the output sensor 63 compares the voltage Vu with a predetermined positive voltage $V_{REF2}$ (for example, 11.5 V), which is lower than the power supply voltage VPWR. When there is a timing at which the voltage Vu is equal to or lower than the predetermined voltage $V_{REF2}$ while the transistor TrH is in the off state, the current polarity detection circuit 53 determines that the polarity of the coil current Iu is negative (i.e., determines that the coil current Iu flows in the sink direction). This is because, in the state where the coil current Iu flows in the sink direction, there is a timing at which the voltage Vu is equal to or higher than the predetermined voltage $V_{REF2}$ due to a current flow from the SPM 13 even when the transistor TrH is turned off (see FIG. 8B).

The predetermined voltages $V_{REF1}$ and $V_{REF2}$ may be different from each other, and typically, "VPWR>$V_{REF2}$>$V_{REF1}$>0". However, it is also possible to set the predetermined voltages $V_{REF1}$ and $V_{REF2}$ to a common voltage (for example, a half of the power supply voltage VPWR).

Further, the polarity of the coil current Iu and the polarity inversion timing may be detected based on the voltage Vu when both of the transistors TrH and TrL are in the off state.

Upon determining that the polarity of the coil current Iu is positive, the current polarity detection circuit 53 maintains (latches) the polarity detection signal Sa at the high level until the current polarity detection circuit 53 determines that the polarity of the coil current Iu is negative. Thereafter, when the current polarity detection circuit 53 determines that the polarity of the coil current Iu is negative, the polarity detection signal Sa is switched from the high level to the low level, and is maintained (latched) at the low level until the current polarity detection circuit 53 determines that the polarity of the current Iu is positive next time. That is to say, when the current polarity detection circuit 53 determines that the polarity of the coil current Iu is positive, the polarity detection signal Sa is switched from the low level to the high level. With such a configuration and operation, the up-edge timing or the down-edge timing of the polarity detection signal Sa can be used as the polarity inversion timing. However, even with such a configuration and operation, determination on whether or not the polarity of the coil current Iu is inverted can be performed only at intervals depending on the frequency of state change of the half bridge circuit 50u. That is to say, the sampling frequency for current polarity detection (polarity inversion detection) depends on the PWM frequency or the PDM frequency.

Fourth Example

A fourth example will be described. Each of the above-mentioned frequencies $f_L$ and $f_H$ and time WD may be variably set. That is to say, for example, the driver IC 30 is provided with a memory (not shown) configured with a nonvolatile memory for storing various setting information in a nonvolatile manner. The MPU 22 can change and set first frequency control data, second frequency control data, and detection prediction interval length data held in the memory by transmitting a predetermined signal to the driver IC 30.

In the SPM driver 33, a plurality of different low side frequencies are set in advance as candidates for the frequency $f_L$, and the frequency controller 55 sets one of the plurality of low side frequencies to the frequency $f_L$ according to the first frequency control data. Similarly, in the SPM driver 33, a plurality of different high side frequencies are set in advance as candidates for the frequency $f_H$, and the frequency controller 55 sets one of the plurality of high side frequencies to the frequency $f_H$ according to the second frequency control data. Similarly, in the SPM driver 33, a plurality of different times are set in advance as candidates for the time WD, and the prediction processor 54 sets one of the plurality of times to the time WD according to the detection prediction interval length data.

Further, the MPU 22 may instruct the driver IC 30 to invalidate the above-described frequency variable control, and when the instruction is issued, the variable target frequency is always maintained at the frequency $f_L$.

Fifth Example

A fifth embodiment will be described.

As described above, the current polarity detection circuit 53 can detect the polarity inversion timing (in other words, zero-cross timing) of a current flowing through a coil of a predetermined phase based on a terminal voltage generated at one end of the coil of the predetermined phase. In the above description, the U-phase is particularly noted as the predetermined phase. However, the predetermined phase may be the V-phase or the W-phase, or may be a set of two or more of the U-phase, the V-phase, and the W-phase phases.

In the half bridge circuit including the transistors TrH and TrL, the drain of the transistor TrH is connected to the first power supply terminal, and the source of the transistor TrL is connected to the second power supply terminal. The first and second power supply terminals are arbitrary as long as they have a fixed potential. However, the potential at the first power supply terminal is higher than the potential at the second power supply terminal. In each half bridge circuit, a diode having a forward direction from the node ND to the first power supply terminal may be connected in parallel to the transistor TrH separately from the parasitic diode of the transistor TrH, and a diode having a forward direction from the second power supply terminal to the node ND may be connected in parallel to the transistor TrL separately from the parasitic diode of the transistor TrL.

The drive control signal generation circuit 52 generates the drive control signals DRVu, DRVv, and DRVw based on the polarity detection signal Sa and the torque command signal Trq*. However, in a case where a torque to be generated in the SPM 13 is predetermined, the torque command signal Trq* may be unnecessary.

Although the example in which the SPM 13 is configured by coils of three phases has been described above, the SPM 13 may be configured by coils of multiple phases other than three phases.

Respective components of the driver IC 30 are formed in semiconductor integrated circuits, and a semiconductor device is constituted by sealing the semiconductor integrated circuits in a housing (package) made of resin. However, a circuit equivalent to the circuit in the driver IC 30 may be configured using a plurality of discrete components. Alternatively, the semiconductor device may be configured by forming a single body of the SPM driver 33 in the form of a semiconductor integrated circuit and sealing the semiconductor integrated circuit in a housing (package) made of resin.

In the above-described embodiment, the present disclosure is applied to a motor driver device (driver IC 30) for the SPM 13 of the HDD device 1. However, the present disclosure can be widely applied to any motor driver device that drives a motor. For example, the present disclosure may be applied to a motor driver device for driving a fan motor for air cooling.

Each half bridge circuit may be modified in such a manner that the transistor TrH is formed of a P-channel type MOSFET. The transistor TrL may also be formed of a P-channel MOSFET.

Each of the transistors described above may be an arbitrary type of transistor. For example, the transistor described above as a MOSFET may be replaced with a junction type FET, an insulated gate bipolar transistor (IGBT), or a bipolar transistor as long as the above-described main ideas are not impaired. The arbitrary type of transistor has a first electrode, a second electrode, and a control electrode. In the FET, one and the other of the first and second electrodes are a drain and a source, respectively, and the control electrode is a gate. In the IGBT, one and the other of the first and second electrodes are a collector and an emitter, respectively, and the control electrode is a gate. In the bipolar transistor not belonging to an IGBT, one and the other of the first and second electrodes are a collector and an emitter, respectively, and the control electrode is a base.

<<Consideration of the Present Disclosure>>

The present disclosure substantiated in the above-described embodiments is considered.

According to one aspect of the present disclosure, a motor driver device (the driver IC 30), which switchingly drives a brushless DC motor having coils of a plurality of phases, includes: a detector (the current polarity detection circuit 53) configured to detect a polarity inversion timing of a current flowing through a coil of a predetermined phase based on a terminal voltage (e.g., the voltage Vu) generated at one end of the coil of the predetermined phase; a drive control signal generator (the drive control signal generation circuit 52) configured to generate a pulse-width-modulated or pulse-density-modulated drive control signal for each of the phases based on the detection result of the detector; and a drive voltage supply (the pre-driver circuit 51 and the half bridge circuits 50u, 50v, and 50w) configured to supply a drive voltage, which corresponds to the drive control signal for each of the phases, to a corresponding one of the coils. The drive control signal generator includes a prediction processor (the prediction processor 54) configured to set a detection prediction interval (the detection prediction interval $P_{EST}[n]$) based on two or more detected polarity inversion timings, and executes a frequency variable control to set a variable target frequency to be higher in the detection prediction interval than outside the detection prediction interval, the variable target frequency being a frequency (PWD frequency) of the pulse-width-modulated drive control signal or a reciprocal (PWM frequency) of a minimum pulse width of the pulse-density-modulated drive control signal.

Based on two or more detected polarity inversion timings, it is possible to predict the next polarity inversion timing and set a detection prediction interval. Further, when the variable target frequency is increased within the detection prediction interval, the resolution of current polarity detection (in other words, the detection resolution of polarity inversion timing) can be enhanced. Although a decrease in resolution of the drive control signal by the increase in the variable target frequency is a concern, in the variable frequency control, since the variable target frequency is relatively lowered outside the detection prediction interval, the decrease in resolution of the drive control signal is suppressed.

According to the present disclosure in some embodiments, it is possible to provide a motor driver device and a semiconductor device which contribute to improvement in resolution of current polarity detection (in other words, detection resolution of polarity inversion timing) while suppressing a decrease in resolution of a drive control signal.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driver device that switchingly drives a brushless direct current (DC) motor having coils of a plurality of phases, the motor driver device comprising:
   a detector configured to detect a polarity inversion timing of a current flowing through a coil of a predetermined phase based on a terminal voltage generated at one end of the coil of the predetermined phase;
   a drive control signal generator configured to generate a pulse-width-modulated or pulse-density-modulated drive control signal for each of the phases based on the detection result of the detector; and
   a drive voltage supply configured to supply a drive voltage, which corresponds to the drive control signal for each of the phases, to a corresponding one of the coils,
   wherein the drive control signal generator includes a prediction processor configured to set a detection prediction interval based on two or more previously detected polarity inversion timings, and executes a frequency variable control to set a variable target frequency to be higher in the detection prediction interval than outside the detection prediction interval, the variable target frequency being a frequency of the pulse-width-modulated drive control signal or a reciprocal of a minimum pulse width of the pulse-density-modulated drive control signal.

2. The motor driver device of claim 1, wherein, in the frequency variable control, the drive control signal generator sets the variable target frequency to a predetermined first frequency outside the detection prediction interval, and sets the variable target frequency to a predetermined second frequency higher than the first frequency in the detection prediction interval, and
   wherein upon detecting the polarity inversion timing after a start of the detection prediction interval, the drive control signal generator returns the variable target frequency from the second frequency to the first frequency in response to the detection of the polarity inversion timing.

3. The motor driver device of claim 2, wherein, when the detection prediction interval ends without detecting the polarity inversion timing after the start of the detection prediction interval, the drive control signal generator returns the variable target frequency from the second frequency to the first frequency in response to the end of the detection prediction interval.

4. The motor driver device of claim 2, wherein, when the polarity inversion timing is detected after the detection prediction interval is set and before the set detection prediction interval is started, the drive control signal generator maintains the variable target frequency at the first frequency for the detection prediction interval.

5. The motor driver device of claim 1, wherein the drive voltage supply generates, as the drive voltage for each of the phases, a voltage including a pulse train according to the drive control signal and a predetermined dead time inserted into the pulse train, and
wherein the detector detects the polarity inversion timing based on a relationship between a pulse width of the terminal voltage generated by the drive voltage at the one end of the coil of the predetermined phase and a pulse width of the drive control signal generated for the predetermined phase.

6. The motor driver device of claim 5, wherein for each of the phases, the drive voltage supply includes a half bridge circuit including a high side transistor and a low side transistor connected to each other in series, and supplies the drive voltage to the corresponding one of the coils from a connection node between the high side transistor and the low side transistor, and
wherein for each of the phases, both of the high side transistor and the low side transistor are turned off in the dead time.

7. The motor driver device of claim 1, wherein for each of the phases, the drive voltage supply includes a half bridge circuit including a high side transistor and a low side transistor connected to each other in series, and supplies the drive voltage to the corresponding one of the coils from a connection node between the high side transistor and the low side transistor,
wherein at least for the predetermined phase, the motor driver device further includes: a high side off detection circuit configured to detect whether or not the high side transistor is in an off state; a low side off detection circuit configured to detect whether or not the low side transistor is in an off state; and a voltage comparison circuit configured to compare a voltage at the connection node between the high side transistor and the low side transistor with a predetermined voltage, and
wherein the detector detects the polarity inversion timing based on the detection result of the high side off detection circuit, the detection result of the low side off detection circuit, and the comparison result of the voltage comparison circuit.

8. The motor driver device of claim 1, wherein the prediction processor predicts a timing at which a polarity inversion timing before being detected arrives based on the two or more previously detected polarity inversion timings, and sets an interval including the predicted timing as the detection prediction interval.

9. The motor driver device of claim 1, wherein the motor driver device switchingly drives a spindle motor that rotates a magnetic disk of a magnetic disk drive as the brushless DC motor.

10. A semiconductor device that forms the motor driver device of claim 1, wherein the motor driver device is formed using an integrated circuit.

* * * * *